United States Patent [19]
Hoshihara et al.

[11] Patent Number: 5,975,611
[45] Date of Patent: Nov. 2, 1999

[54] VEHICLE SEAT UNIT

[75] Inventors: Naoaki Hoshihara, Aichi-ken; Takami Terada; Yukifumi Yamada, both of Toyota, all of Japan

[73] Assignee: Aisin Seiki Kabushiki Kaisha, Japan

[21] Appl. No.: 08/910,741

[22] Filed: Aug. 13, 1997

[30]     Foreign Application Priority Data

Aug. 15, 1996  [JP]  Japan ................................. 8-232628

[51] Int. Cl.⁶ ............................................. B60N 2/04
[52] U.S. Cl. .................... 296/65.03; 248/503.1; 297/336
[58] Field of Search .............. 296/65.03; 297/335, 297/336, 331; 248/503.1

[56]             References Cited

U.S. PATENT DOCUMENTS

| 5,372,398 | 12/1994 | Aneiros et al. | 296/65.03 |
| 5,482,345 | 1/1996 | Bolsworth et al. | 296/65.03 |
| 5,547,242 | 8/1996 | Dukatz et al. | 296/65.03 |
| 5,697,662 | 12/1997 | Leftwich | 248/503.1 X |

FOREIGN PATENT DOCUMENTS

| 6-50544 | 7/1994 | Japan . |
| 7-4150 | 1/1995 | Japan . |
| 7-164941 | 6/1995 | Japan . |

*Primary Examiner*—Dennis H. Pedder
*Attorney, Agent, or Firm*—Finnegan, Henderson, Farabow, Garrett & Dunner, L.L.P.

[57]                ABSTRACT

A vehicle seat unit with a forwardly tiltable seat cushion which is easy to handle and which is capable of being fastened securely to a vehicle floor. A pair of hook members provided at the rear portion of the seat cushion are engageable with and disengageable from a pair of strikers fixed to the vehicle floor and a pair of stop pins provided on the vehicle floor are engageable with and disengageable from another pair of hook members provide at the front portion of the seat cushion through handles, respectively.

4 Claims, 7 Drawing Sheets

VEHICLE SEAT UNIT

BACKGROUND OF THE INVENTION

The present invention relates to a vehicle seat unit having a forwardly tiltable seat cushion.

It has been attempted to tilt a vehicle seat cushion forwardly in order to make use of the portion of the vehicle floor behind the seat cushion as a luggage compartment or hold it in a forwardly tilted easy entry position for allowing the seat cushion to be readily traversed fore and aft either by a person outside the vehicle or a passenger. One example of such attempt is disclosed in the Japanese Patent Laid-Open Publication No. Hei 7-164941(1995) or the Japanese Utility Model Laid-Open Publication No. Hei 6-50544(1994). This prior art example has a structure that brackets fixed to the front portion of a frame of the seat cushion are respectively made engageable with brackets or strikers fixed to a vehicle floor through pins or hook members to thereby allow the seat cushion to tilt forward, that is, to stand upright. In addition to this structure, at the back of the frame of the seat cushion there are arranged fixing means for fixing the cushion to the vehicle floor whereby when the seat cushion is tilted forward, the fixing means are removed to set the rear of the seat cushion frame free from the vehicle floor.

In the case of the example disclosed in the above-mentioned Publication No. Hei 7-164941(1995), since the pins fixed to the brackets on the side of the seat cushion frame are pivotally attached to the hook members of the bracket on the vehicle floor through spring means, when the seat is removed from the vehicle floor, there arises the disadvantage that it is not easy to remove the seat from the vehicle floor because of the engagement of the pins with the spring means. Conversely, in the case of the example disclosed in another Publication No. Hei 6-50544(1994), during the operation of forwardly tilting the seat cushion, the brackets at the front portion of the seat cushion frame tends to slip out of the strikers fixed to the vehicle floor so that the seat is disconnected from the vehicle floor with ease.

SUMMARY OF THE INVENTION

In order to eliminate the above-described disadvantages of the conventional tiltable vehicle seat unit, the present invention has made use of handle means, as a basic means for solving the problems involved in the conventional vehicle seat unit, in front of the frame of the seat cushion.

Accordingly, an object of the present invention is to provide an improved vehicle seat unit having a forwardly tiltable seat cushion free of the drawbacks of the conventional vehicle seat unit.

More specifically, the invention provides a vehicle seat unit comprising a pair of first hook members provided at either the front or the rear portion of a seat cushion, a pair of second hook members provided at either the rear or front portion of the seat cushion, a pair of strikers fixed to a vehicle floor and capable of engagement with and disengagement from the second hook members, respectively, and a pair of fastening devices fixed to the vehicle floor and capable of engagement with and disengagement from the first hook members, respectively, through handle means.

The use of the handle means makes it easy to handle the seat unit of the present invention since the engagement between the hook members and the fastening devices can be easily released or tightened by the operation of the handle means.

PREFERRED EMBODIMENTS OF THE INVENTION

Figure 1:
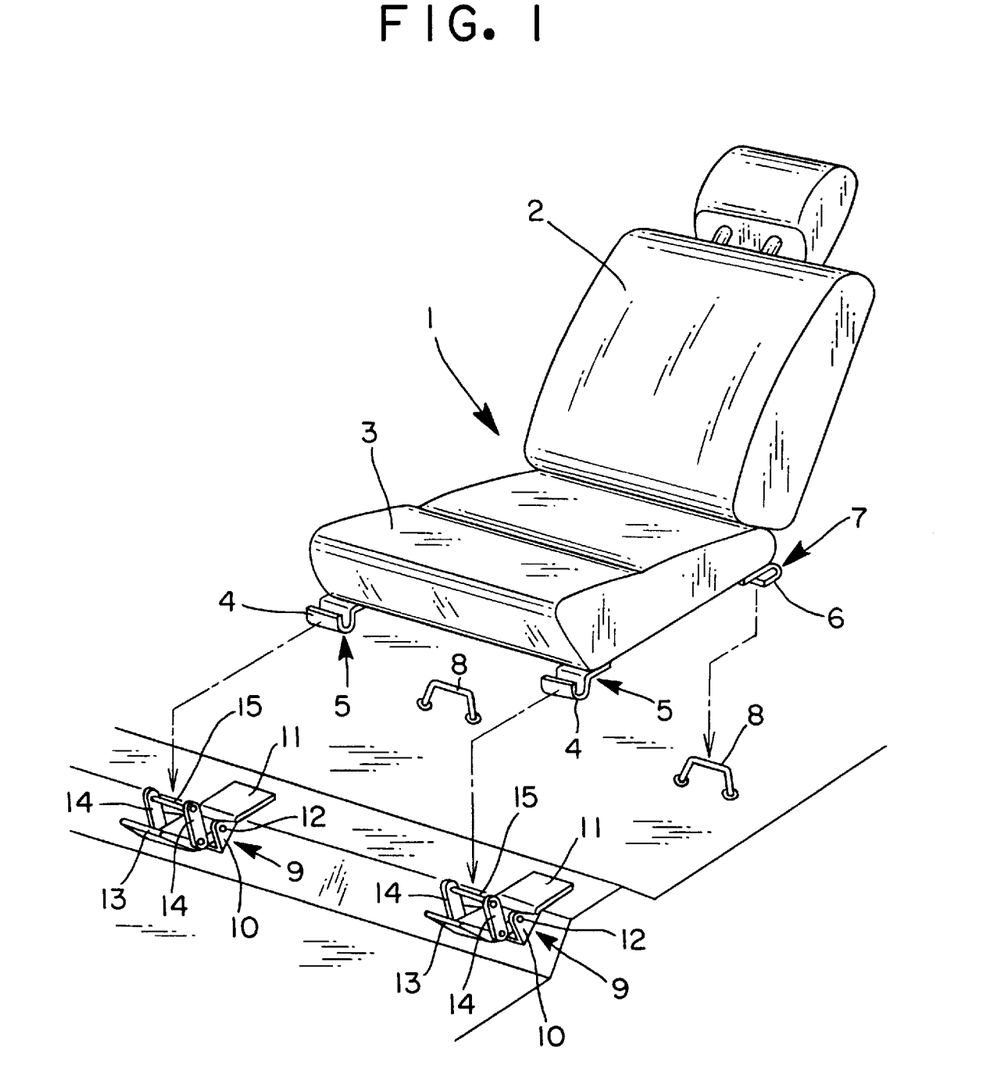
FIG. 1 is a perspective view of a vehicle seat unit according to a first embodiment of the present invention.

As shown in FIG. 1, a vehicle seat 1 is provided with a seat back 2 and a seat cushion 3. Further, a pair of first hook members 5 each having an upward-facing hook portion 4 are fixed to the front portion of a frame of the seat cushion 3 and a pair of second hook members 7 each having a forward-facing hook portion 6 are fixed to the rear portion of the frame of the seat cushion 3. The hook portions 6 of the second hook members 7 can respectively engage strikers 8 fixed to a vehicle floor.

A pair of fastening devices 9 are fixed to the vehicle floor at positions corresponding respectively to the first pair of hook members 5. Each of the fastening devices 9 includes a bracket 11 having flanges fixed to the vehicle floor and facing each other, a handle 13 pivotally attached to the bracket 11 through a pin 12 and a stop pin 15 supported by the upper portion of a pair of arms 14, 14 pivotally attached to the side surfaces of the handle 13, respectively.

The mounting of the seat 1 to the vehicle floor is performed such that the hook portion 6 of each of the second hook members 7 is caused to engage each of the strikers 8, then the stop pin 15 is caused to engage the hook portion 6 of the first hook member 7 and the handle 13 is rotated downward about the pin 12 in the counter-clockwise direction to thereby fix the seat 1 to the vehicle floor. In the shown example, the fastening devices 9 are arranged in front of the seat 1 but they may be arranged behind the seat 1 while the strikers 8 may be arranged in front of the seat 1. In this case, the positions of the first hook members 5 and those of the second hook members 7 are reversed.

Figure 2:
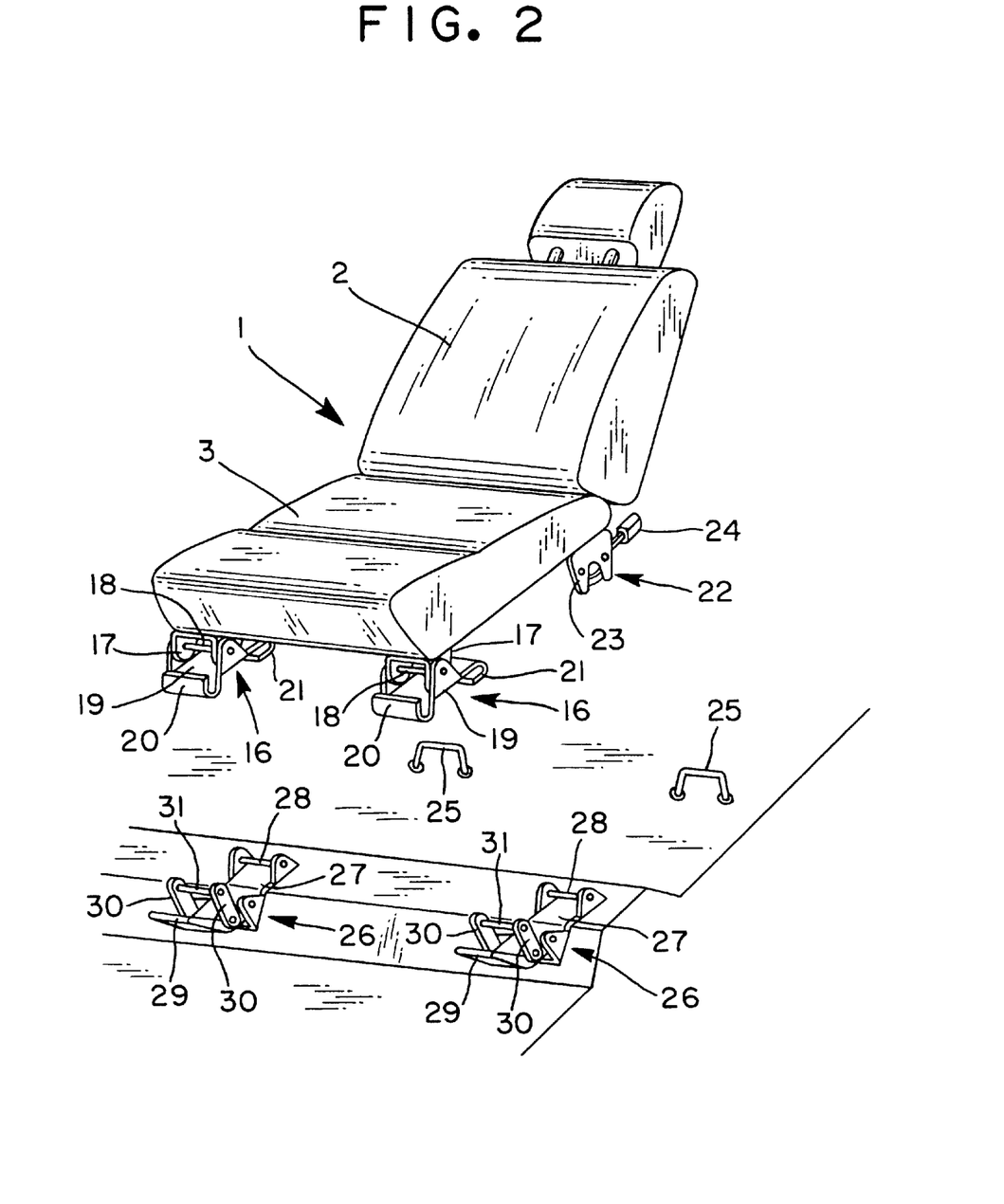
FIG. 2 is a perspective view of a vehicle seat unit according to a second embodiment of the invention.

In FIG. 2 there is shown a second embodiment of the present invention. As shown, a pair of first hook members 16 are fixed to the front portion of the seat cushion frame. Each of the first hook members 16 comprises a channel-shaped bracket 17 fixed to the seat cushion frame and a hook bracket 19 pivotally attached to the bracket 17 through a pin 18 and further, the bracket 19 has a front upward-facing hook section 20 and a rear forward-facing hook section 21.

Further, a pair of second hook members 22 are fixed to the rear of the seat cushion frame. Each of the pair of second hook members 22 comprises a U-shaped latch 23 opening downward to form an aperture, a lever 24 for opening and closing the aperture of the U-shaped latch 23 and a spring (not shown) for urging the lever 24 in a direction in which to close the aperture of the latch 23.

Each of a pair of strikers 25 fixed to the vehicle floor pushes the lever 24 upward to open the aperture of the U-shaped latch 23 allowing the striker 25 to be inserted into the aperture and when the lever 24 is returned to its original position, the aperture is closed by the lever 24 to thereby bring the striker 25 into engagement with the U-shaped latch. To disengage the striker 25 from the U-shaped latch 23, the lever 24 may be rotated counter-clockwise to open the aperture of the U-shaped latch 23 allowing the striker 25 to be dislocated from the aperture.

Each of fastening devices 26 includes a bracket 27 fixed to the vehicle floor, a first stop pin 28 supported by a bracket 27, a handle 29 pivotally attached to the bracket 27 and a second stop pin 31 supported by handle 29 through a pair of links 30.

When the seat 1 is fixed to the vehicle floor, the U-shaped latch 23 is brought into engagement with the striker 25 and the first stop pin 28 is caused to engage the forward-facing hook section 21 of the first hook member 16. Then, the second stop pin 31 is caused to engage the upward-facing hook section 20 and in this case, the handle 29 is moved downward so that the first hook member 16 and the fastening device 26 are tightly fastened to each other.

To tilt the seat 1 forward, the seat back 2 may be folded over the seat cushion 3, the lever 24 may be operated to open the aperture of the U-shaped latch 23 to cause the latch 23 to become disengaged from the striker 25 thereby releasing the rear portion of the seat cushion frame from the vehicle floor and the seat 1 may be tilted forward about the pin 18.

A third embodiment of the present invention is shown in FIGS. 3 through 7. As shown, a pair of first hook members 32 are fixed to the front portion of the seat cushion frame. Each of the first hook members 32 includes a channel-shaped bracket 33 fixed to the seat cushion frame and a hook bracket 35 pivotally attached to the bracket 33 through a pin 34. The hook bracket 35 is substantially U-shaped in section and on one of the side surfaces thereof, there are arranged an arm 36 having its one end pivotally supported on the front portion of the side surface and a link 37 pivotally supported on the other end of the arm 36 through a stop pin 41, with the rear of the link 37 being fixed to a guide pin 39 passing through a cam hole 38 drilled in that side surface. The guide pin 39 has its one end fixed to a handle 40 pivotally supported by that side surface.

Figure 3:
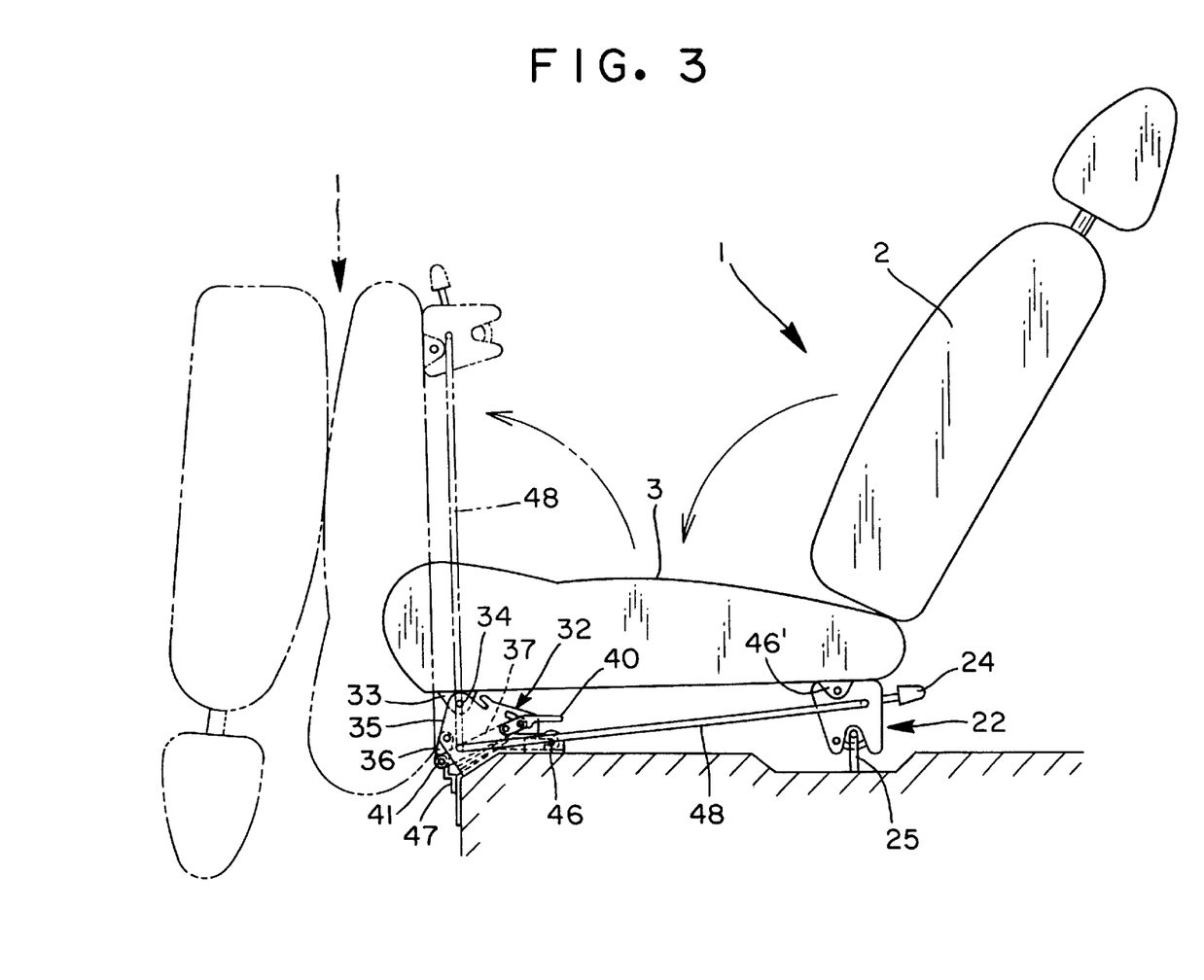
FIG. 3 is a perspective view of an essential portion of a vehicle seat unit according to a third embodiment of the present invention.
Figure 4:
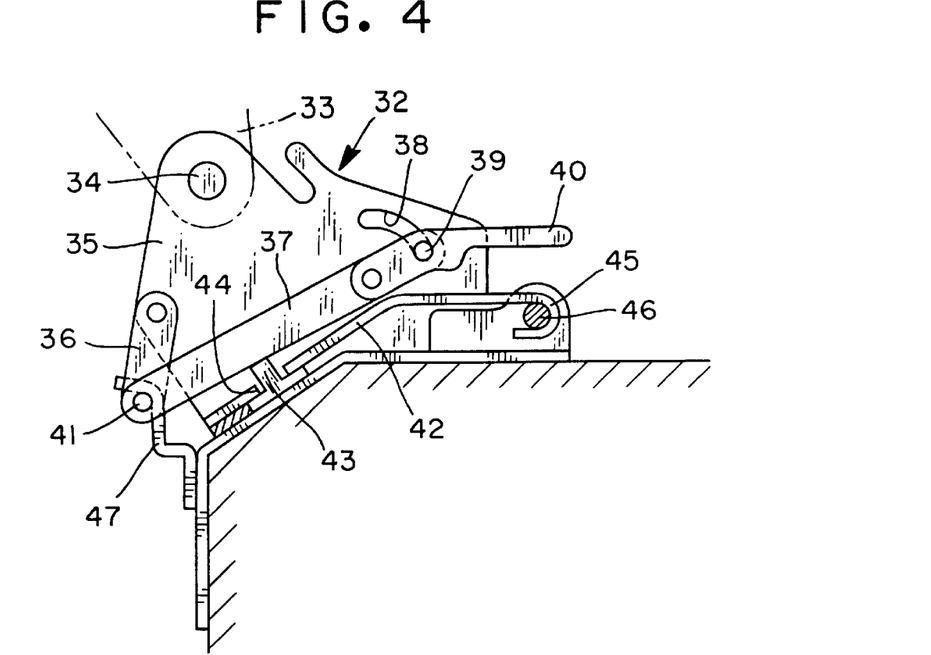
FIG. 4 is a side view of an essential portion of the vehicle seat unit of FIG. 3 showing how hook members of a seat are respectively fastened to brackets on the floor of a vehicle.

A bottom wall 42 of the bracket 35 has at the front portion thereof a hole 44 for receiving a positioning pin 43 fixed to the vehicle floor and also has a forward-facing hook section 45 at the rear thereof.

The U-shaped latch 23 shown in FIG. 2 is made to be pivotally supported by a rear bracket 46' and the U-shaped latch 23 is made engageable with, and disengageable from, the striker 25 of the vehicle floor.

At the front portion of the vehicle floor there is arranged a striker pin 46 engageable with the hook portion 45 and a hook member 47 engageable with the stop pin 41 is arranged on an inclined surface of the front portion of the vehicle floor. Further, a rod 48 for connecting the U-shaped latch 23 and the first hook member 32 may preferably be provided.

To tilt the seat 1 forward, the lever 24 may be operated to separate the U-shaped latch 23 from the striker 25 and the seat 1 may be tilted forward about the pin 34.

Figure 5:
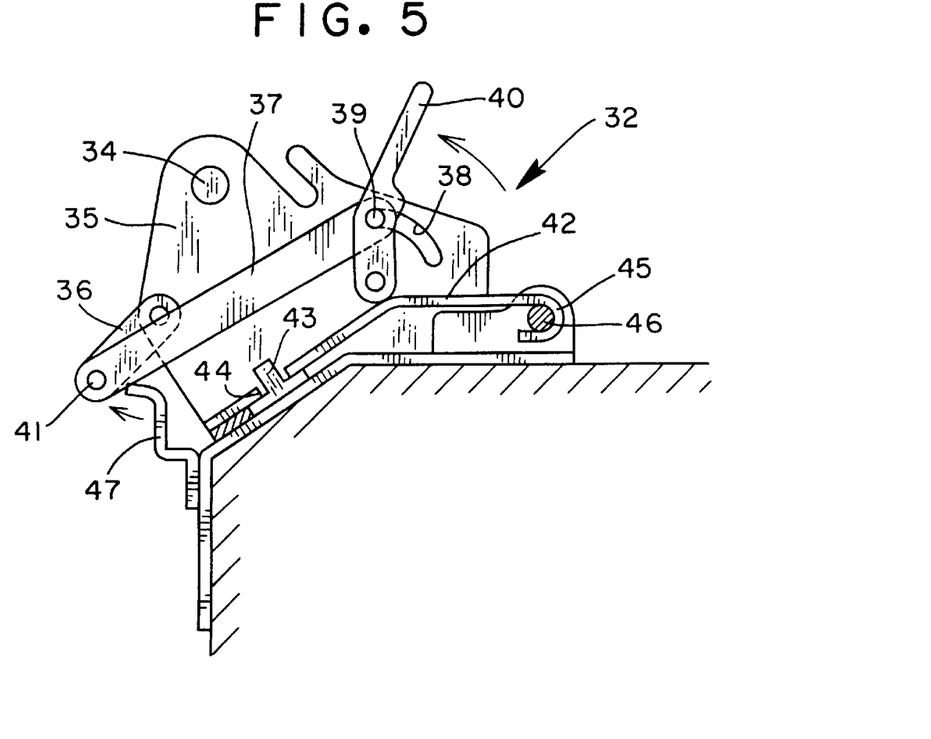
FIG. 5 is a side view of the vehicle seat unit of FIG. 4 showing a state in which a handle is turned upward.
Figure 6:
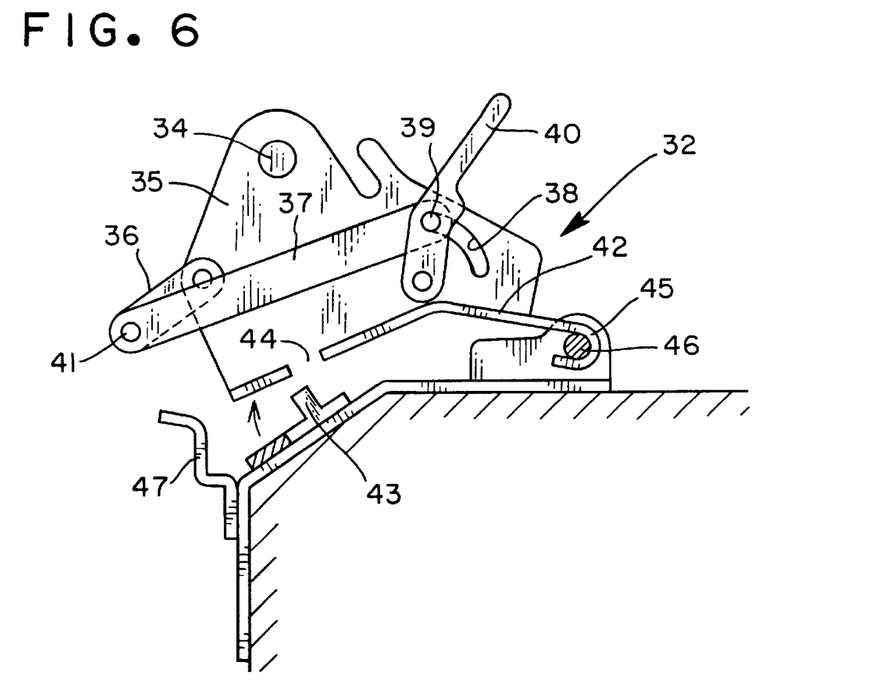
FIG. 6 is a side view of the vehicle seat unit of FIG. 4 showing a state in which the seat is raised.
Figure 7:
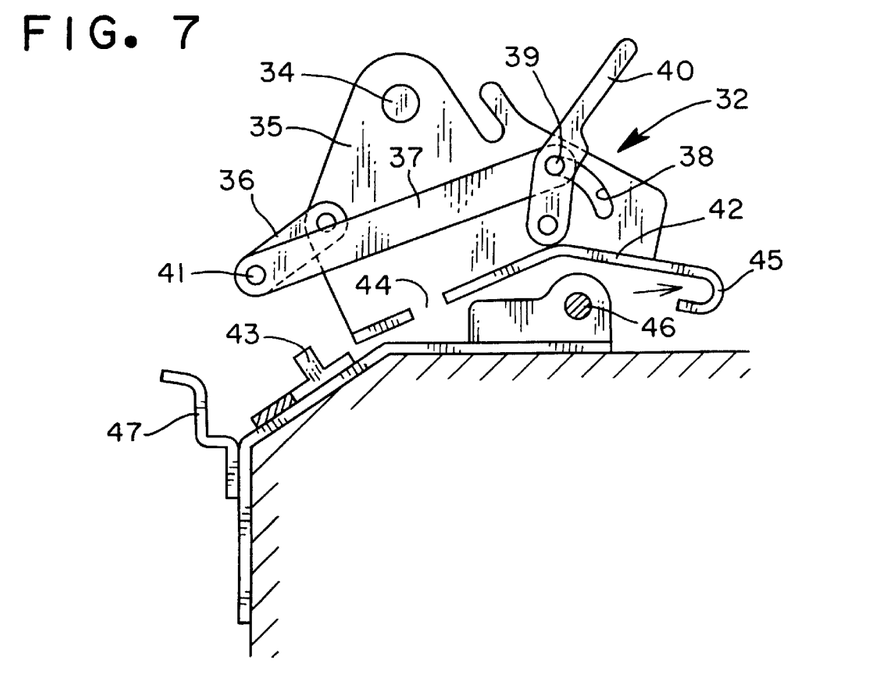
FIG. 7 is a side view of the vehicle seat unit of FIG. 4 showing a state in which the seat is disconnected from the floor of the vehicle.

To disconnect the seat 1 from the vehicle floor, the U-shaped latch 23 and the striker 25 are separated from each other by using the lever 24. Then, the handle 40 is rotated counter-clockwise as shown in FIG. 5 to move the guide pin 39 along the cam hole 38. This movement of the guide pin 39 results in pushing the link 37 forward to separate the stop pin 41 from the hook member 47. As a result, the engagement of the hole 44 of the bottom wall 42 of the bracket 35 with the positioning pin 43 is released by the upward movement of the bracket 35 as shown in FIG. 6 and in this state, the bracket 35 is moved rearward to cause the striker pin 46 to be separated from the hook section 45 (see FIG. 7). In this way, the seat 1 is released from the vehicle floor to move freely.

Figure 8:
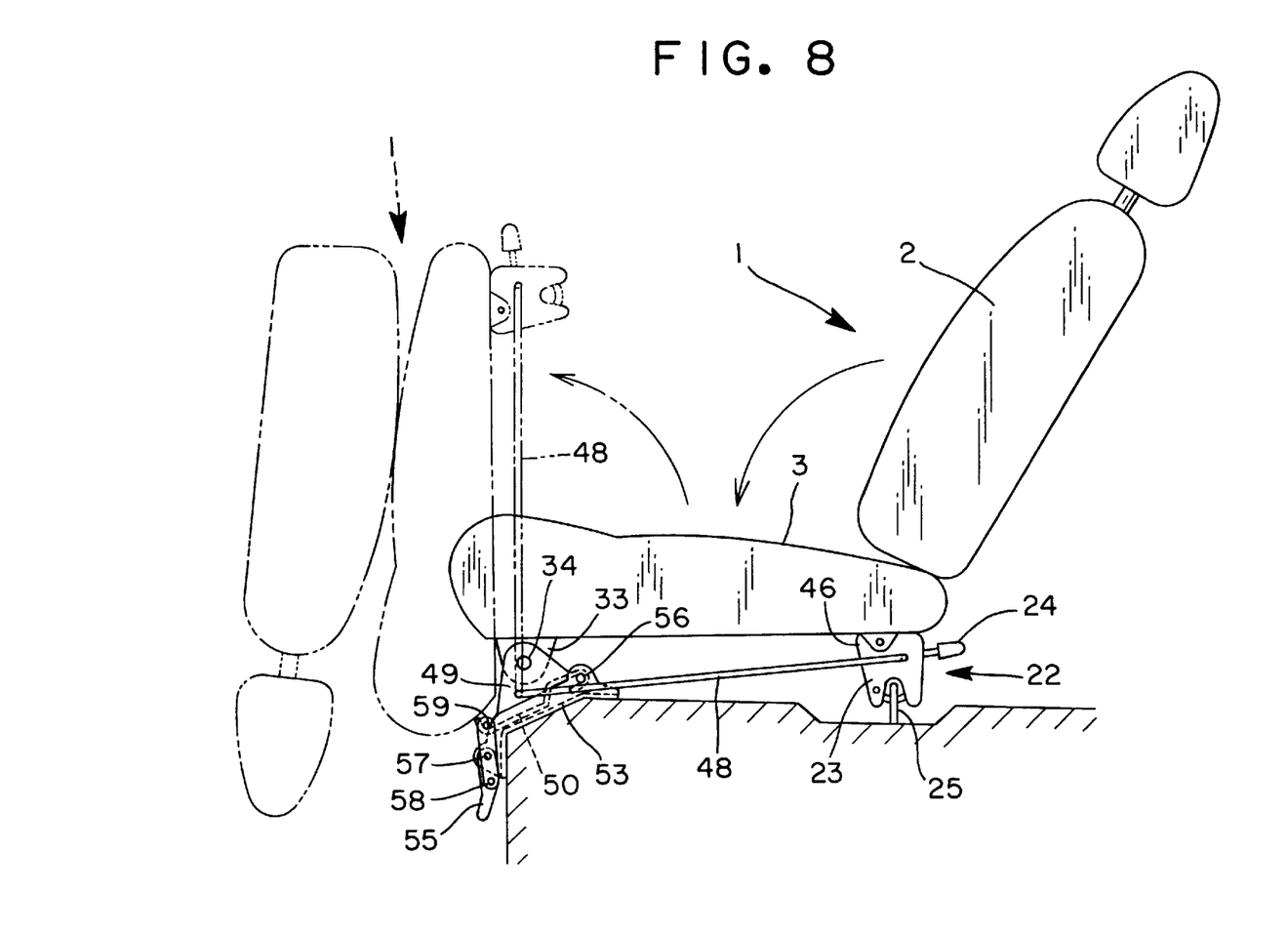
FIG. 8 is a perspective view of a vehicle seat unit according to a fourth embodiment of the invention.
Figure 9:
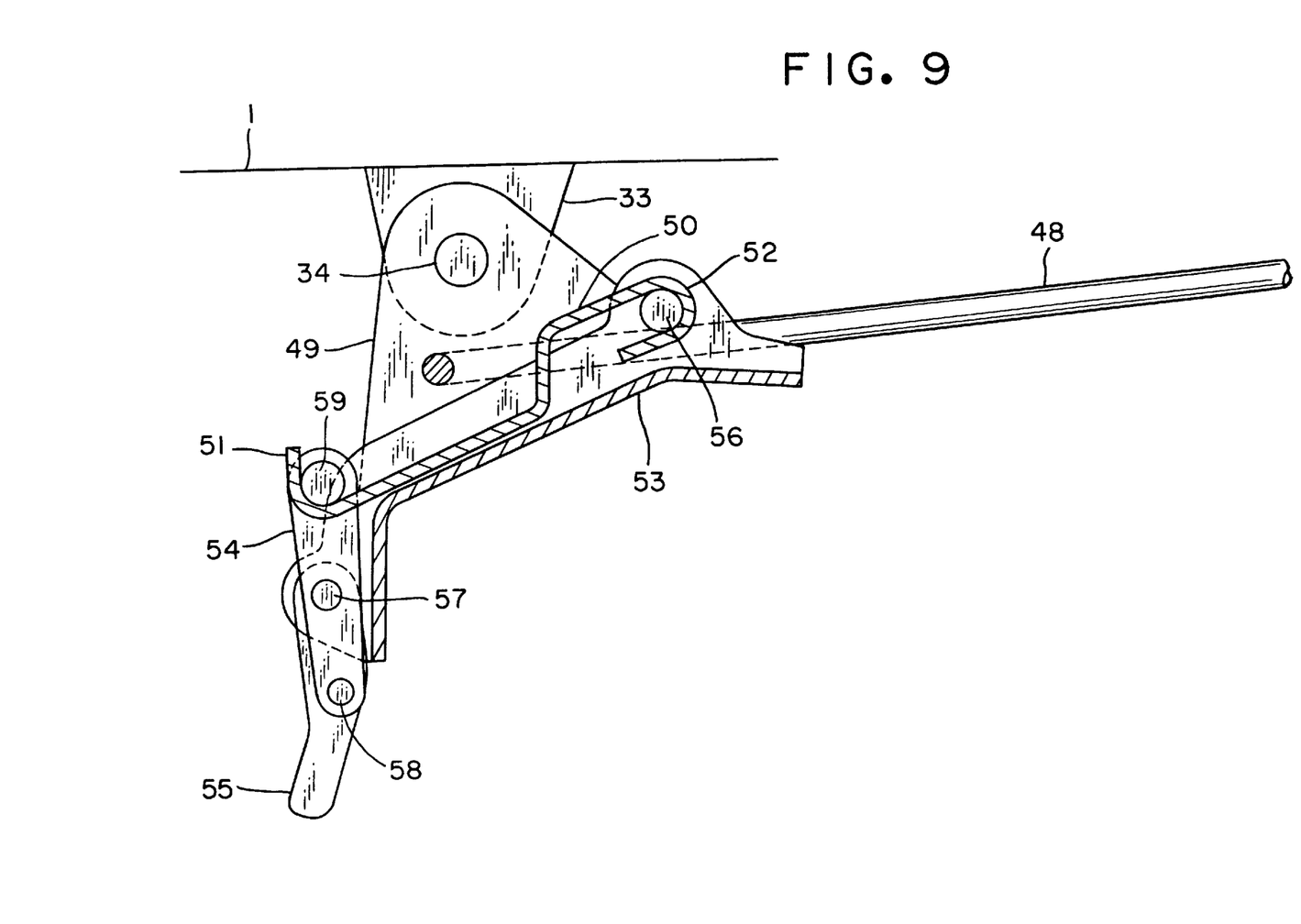
FIG. 9 is an enlarged sectional view of a portion of the vehicle seat unit of FIG. 8 where the seat and the floor are fixed.

A fourth embodiment of the present invention is shown in FIGS. 8 and 9. In these figures, a combination of the U-shaped latch 23 and the striker 25 at the rear portion of the seat 1 is omitted because it is quite the same as that in the case of the third embodiment of the invention shown in FIG. 3.

As shown, each of a pair of brackets 49 which are swingably supported respectively by the pair of brackets 33 fixed to the seat cushion frame through the pins 34 is substantially U-shaped in section and a bottom wall 50 of the bracket 49 is provided with an upward-facing hook section 51 at the front, and a forward-facing hook section 52 at the rear thereof.

The U-shaped latch 23 and the hook bracket 49 are connected to each other by means of a rod 48 keeping constant the space between the two.

A pair of substantially U-shaped fixed brackets 53 are fixed to the vehicle floor. Each of the pair of brackets 53 includes a handle 55 attached with an arm 54 at the front portion thereof and a striker pin 56 at the rear portion thereof. The handle 55 is swingably supported by the fixed bracket 53 through a pin 57. The arm 54 has its one end pivotally supported by the handle 55 through a pin 58 and a stop pin 59 fixed at the other end thereof.

To tilt the seat 1 forward, the lever 24 may be operated to separate the U-shaped latch 23 from the striker 25 and the seat 1 may be rotated about the pin 34.

To disconnect the seat 1 from the vehicle floor, the engagement of the U-shaped latch 23 with the striker 25 may be released. Then, the handle 55 may be rotated counter-clockwise (FIG. 9) about the pin 57 and the arm 54 may be moved upward to separate the stop pin 59 from the front hook section 51. After that, the seat 1 is moved rearward to separate the rear hook section 52 from the striker pin 56. In this way, the seat 1 can be disconnected from the vehicle floor.

It should be noted that in any of the embodiments, in order to fix the seat 1 to the vehicle floor, an operation reversed to the removing operation may be taken.

As many apparently widely different embodiments of the present invention can be made without departing from the spirit and scope thereof, it is to be understood that the invention is not limited to the specific embodiments thereof except as defined in the appended claims.

What is claimed is:

1. A vehicle seat unit comprising: a seat cushion adapted to be fixed on a vehicle floor; a pair of first hook member devices provided at either a front or a rear portion of the seat cushion; a pair of second hook member devices provided at the other portion of the seat cushion in opposite relationship with the pair of first hook member devices, respectively; a pair of strikers fixed to the vehicle floor so as to come into engagement with and into disengagement with the pair of second hook member devices, respectively; and a pair of fastening devices fixed to the vehicle floor and adapted to engage and disengage said first hook member devices through operations of handles, respectively, each of said first hook member devices having a stop pin which is movable by an arm pivotally connected to the respective hook member device and engageable with and disengageable with a hook member of a respective fastening device.

2. A vehicle seat unit according to claim 1, wherein each of said pair of second hook member devices comprises a U-shaped latch having an aperture and a lever for opening the aperture, and each of said strikers can enter into and be released out of the aperture of said latch.

3. A vehicle seat unit comprising: a seat cushion adapted to be fixed on a vehicle floor; a pair of first hook member devices provided at either a front or a rear portion of the seat cushion; a pair of second hook member devices provided at the other portion of the seat cushion in opposite relationship with the pair of first hook member devices, respectively; a pair of strikers fixed to the vehicle floor so as to come into engagement with and into disengagement with the pair of second hook member devices, respectively; and a pair of fastening devices fixed to the vehicle floor and adapted to engage and disengage said first hook member devices through operations of handles, respectively; and wherein each of said pair of first hook member devices includes a hook bracket having a cam hole and pivotally supported by the seat cushion, a link swingably supported by said hook bracket through an arm, a stop pin for connecting said link and said arm, a handle pivotally supported by said hook bracket and a pin passing through said cam hole and connecting said link and said handle, said bracket being substantially U-shaped in section and provided with a hook section and a fitting hole drilled in the bottom wall thereof, each of said pair of fastening devices being provided with a striker pin engageable with said hook section of said bracket, a positioning pin capable of fitting into and being released from said fitting hole and a hook member engageable with said stop pin of said each first hook member device.

4. A vehicle seat unit according to claim 1, wherein each of said pair of second hook member devices is provided with a U-shaped latch having an aperture and pivotally supported on said seat cushion, and a lever for opening and closing said aperture.

* * * * *

UNITED STATES PATENT AND TRADEMARK OFFICE
CERTIFICATE OF CORRECTION

PATENT NO. : 5,975,611
DATED : November 2, 1999
INVENTOR(S) : Naoaki HOSHIHARA et al.

It is certified that error appears in the above-identified patent and that said Letters Patent is hereby corrected as shown below:

Claim 4, col. 6, line 17, "claim 1" should be --claim 3--.

Signed and Sealed this

Sixteenth Day of May, 2000

Attest:

Q. TODD DICKINSON

*Attesting Officer*  *Director of Patents and Trademarks*